(12) United States Patent
Amendolea et al.

(10) Patent No.: US 9,022,236 B1
(45) Date of Patent: May 5, 2015

(54) ROTARY CAROUSEL APPARATUS AND SYSTEM

(71) Applicant: Centricity Corporation, Girard, OH (US)

(72) Inventors: Richard M. Amendolea, Canfield, OH (US); Chris T. Grosbeck, Youngstown, OH (US)

(73) Assignee: Centricity Corporation, Girard, OH (US)

( * ) Notice: Subject to any disclaimer, the term of this patent is extended or adjusted under 35 U.S.C. 154(b) by 27 days.

(21) Appl. No.: 13/771,493

(22) Filed: Feb. 20, 2013

Related U.S. Application Data

(60) Provisional application No. 61/600,869, filed on Feb. 20, 2012.

(51) Int. Cl.
| | |
|---|---|
| *A47F 5/02* | (2006.01) |
| *B65G 1/02* | (2006.01) |
| *F16H 37/00* | (2006.01) |
| *A47B 49/00* | (2006.01) |
| *A47F 5/025* | (2006.01) |

(52) U.S. Cl.
CPC ............... *B65G 1/026* (2013.01); *F16H 37/00* (2013.01); *A47B 49/00* (2013.01); *A47F 5/025* (2013.01); *A47F 5/02* (2013.01)

(58) Field of Classification Search
CPC ......... A47F 5/025; A47F 5/0037; A47F 5/02; A47B 49/008; A47B 63/062; A47B 49/00; B65G 1/026; F16H 37/00
USPC ............ 211/131.1, 144, 163–166, 1.53–1.56; 108/103, 139, 22; 312/305, 125, 135
See application file for complete search history.

(56) References Cited

U.S. PATENT DOCUMENTS

| | | | | | |
|---|---|---|---|---|---|
| 154,307 | A | * | 8/1874 | Westphal | 312/125 |
| 488,594 | A | * | 12/1892 | Yost | 108/103 |
| 491,277 | A | * | 2/1893 | Berger | 108/103 |
| 516,454 | A | * | 3/1894 | Sherman | 312/135 |
| 574,380 | A | * | 1/1897 | Bradley | 312/135 |
| 615,032 | A | * | 11/1898 | Mandel | 312/135 |
| 799,233 | A | * | 9/1905 | Hubbell | 312/135 |
| 964,543 | A | * | 7/1910 | Pease | 211/165 |
| 991,541 | A | * | 5/1911 | Rapoport | 312/305 |
| 1,033,931 | A | * | 7/1912 | Pryke | 34/187 |
| 1,111,061 | A | * | 9/1914 | Ericson | 211/163 |
| 1,248,682 | A | * | 12/1917 | Lauterbur | 312/305 |
| 1,282,048 | A | * | 10/1918 | Cook | 362/132 |
| 1,470,217 | A | * | 10/1923 | Claus | 108/20 |
| 1,494,051 | A | * | 5/1924 | Young | 108/103 |
| 1,549,467 | A | * | 8/1925 | Dumond et al. | 312/9.46 |

(Continued)

*Primary Examiner* — Joshua J Michener
*Assistant Examiner* — Devin Barnett
(74) *Attorney, Agent, or Firm* — The Webb Law Firm

(57) ABSTRACT

A rotary carousel apparatus includes a stationary base and a central column fixed relative to the base. Rotatable first and second drive plates are positioned to rotate about a central axis of the column. At least one torque tube assembly extends between the first drive plate and at least one second drive plate and is operative for rotational movement with a rotation of the drive plates. At least one shelf is connected to the at least one torque tube assembly. A drive assembly is operatively directly or indirectly coupled to one of the first drive plate and the at least one second drive plate, such that rotation of the drive assembly causes a corresponding rotation of one of the first and second drive plates connected thereto and a rotation of the other of the first and second drive plates through the at least one torque tube assembly.

16 Claims, 11 Drawing Sheets

(56) References Cited

U.S. PATENT DOCUMENTS

| | | | | |
|---|---|---|---|---|
| 1,678,088 A * | 7/1928 | Sideman | | 312/135 |
| 1,755,029 A * | 4/1930 | Schreiber | | 211/144 |
| 1,866,987 A * | 7/1932 | Principessa et al. | | 34/665 |
| 1,881,938 A * | 10/1932 | Prodhomme | | 211/1.56 |
| 2,081,856 A * | 5/1937 | Frick | | 211/131.1 |
| 2,086,509 A * | 7/1937 | Mueller | | 211/131.1 |
| 2,089,783 A * | 8/1937 | Chace et al. | | 34/187 |
| 2,113,386 A * | 4/1938 | Schneider | | 108/139 |
| 2,338,324 A * | 1/1944 | Floyd | | 108/105 |
| 2,507,834 A * | 5/1950 | Storer et al. | | 62/229 |
| 2,511,715 A * | 6/1950 | Kappel | | 211/78 |
| 2,527,132 A * | 10/1950 | Jackson et al. | | 248/131 |
| 2,680,668 A * | 6/1954 | Stanfiel et al. | | 312/135 |
| 2,759,611 A * | 8/1956 | Davis | | 108/20 |
| 2,762,513 A * | 9/1956 | Zaninovich | | 108/20 |
| 3,160,451 A * | 12/1964 | Lewis | | 312/196 |
| 3,179,070 A * | 4/1965 | Beller | | 108/103 |
| 3,538,863 A * | 11/1970 | Howard et al. | | 108/94 |
| 3,693,807 A * | 9/1972 | Larson | | 211/163 |
| 3,844,230 A * | 10/1974 | Hudson et al. | | 108/60 |
| 3,868,916 A * | 3/1975 | Ohlson | | 108/103 |
| 4,236,769 A * | 12/1980 | Mueller | | 312/135 |
| 4,273,393 A * | 6/1981 | Foley et al. | | 312/97.1 |
| 4,630,550 A * | 12/1986 | Weitzman | | 108/155 |
| 4,643,107 A * | 2/1987 | Gunn et al. | | 109/48 |
| 4,697,856 A * | 10/1987 | Abraham | | 312/305 |
| 4,736,856 A * | 4/1988 | Alneng et al. | | 211/131.1 |
| 5,050,746 A * | 9/1991 | Frankel | | 211/34 |
| 5,280,840 A * | 1/1994 | Terpening | | 211/165 |
| 5,304,110 A * | 4/1994 | Obrist | | 483/14 |
| 5,343,816 A * | 9/1994 | Sideris | | 108/94 |
| 5,411,153 A * | 5/1995 | Unfried | | 211/188 |
| 5,713,648 A * | 2/1998 | Geib et al. | | 312/249.2 |
| 5,984,114 A * | 11/1999 | Frankel | | 211/34 |
| 6,328,172 B2 * | 12/2001 | Alneng | | 211/144 |
| 6,591,993 B2 * | 7/2003 | Humphrey | | 211/85.14 |
| 6,626,305 B2 * | 9/2003 | Domenig et al. | | 211/144 |
| 6,883,887 B1 * | 4/2005 | Mogensen | | 312/408 |
| 7,153,252 B2 * | 12/2006 | Luscher | | 483/62 |
| 8,051,994 B2 * | 11/2011 | Jin et al. | | 211/163 |
| 8,210,373 B2 * | 7/2012 | Liao | | 211/131.1 |
| 8,356,953 B2 * | 1/2013 | Sagel | | 403/348 |
| 8,372,634 B2 * | 2/2013 | Lin et al. | | 435/307.1 |
| 8,459,474 B2 * | 6/2013 | Sagel | | 211/144 |
| 8,469,228 B2 * | 6/2013 | Adams | | 221/120 |
| 2001/0000896 A1 * | 5/2001 | Alneng | | 211/144 |
| 2003/0173321 A1 * | 9/2003 | Craft et al. | | 211/144 |
| 2003/0177960 A1 * | 9/2003 | Schenker et al. | | 108/115 |
| 2003/0196978 A1 * | 10/2003 | Humphrey | | 211/163 |
| 2005/0265778 A1 * | 12/2005 | Tzeng | | 403/231 |
| 2007/0017887 A1 * | 1/2007 | Rapier, III | | 211/166 |
| 2007/0137433 A1 * | 6/2007 | Amendolea et al. | | 74/813 C |
| 2008/0197087 A1 * | 8/2008 | Hunter | | 211/1.53 |
| 2009/0267437 A1 * | 10/2009 | Chai et al. | | 310/156.25 |
| 2010/0024322 A1 * | 2/2010 | Pope | | 52/126.1 |
| 2011/0100940 A1 * | 5/2011 | Liao | | 211/133.1 |
| 2011/0127228 A1 * | 6/2011 | Sagel | | 211/144 |
| 2012/0120757 A1 * | 5/2012 | Deal et al. | | 366/343 |
| 2012/0241400 A1 * | 9/2012 | Hardin | | 211/144 |
| 2013/0334148 A1 * | 12/2013 | Eberle et al. | | 211/1.53 |

* cited by examiner

ROTARY CAROUSEL APPARATUS AND SYSTEM

CROSS-REFERENCE TO RELATED APPLICATIONS

The present application claims priority to U.S. Provisional Patent Application No. 61/600,869, filed Feb. 20, 2012, entitled "Rotary Carousel Apparatus and System". The entire disclosure of this application is incorporated by reference herein.

BACKGROUND OF THE INVENTION

1. Field of the Invention

The present invention relates to a rotary carousel apparatus and system for use in a variety of applications and environments, and with particular use in the field of item storage and retrieval.

2. Description of the Related Art

Carousel-type devices are generally known in the art for storage of various items. In certain applications, the existing carousel-type devices may be motorized or automated. In such application, items are stored on one or more vertically arranged shelves, which are rotatable about a common axis by a drive mechanism. However, many existing carousel-type devices do not have the necessary characteristics and functionality to provide precise and accurate storage and retrieval of items. For example, conventional carousel-type devices are typically powered by AC motors and driven utilizing a chain- or belt-drive arrangement. This is based on the fact that they are generally accessed by humans, and the need for accurate positioning is not necessary. With the ever increasing use of robotics comes the need for a precision carousel having accurate and repeatable rotational movement.

Traditional carousel-type devices exhibit backlash in the drive mechanism due to the inherent "slop" in the components. In addition, the conventional carousel-type devices require an external framework to support the rotating assembly, which increases their complexity and cost. Accordingly, there is a need in the art for an improved rotary carousel apparatus and system that provides enhanced precision and accuracy in the storage and retrieval of items.

SUMMARY OF THE INVENTION

Accordingly, and generally, a rotary carousel apparatus is provided to address and/or overcome certain deficiencies or drawbacks associated with existing carousel-type devices. Preferably, provided is a rotary carousel apparatus that leads to enhanced precision and accuracy in the storage and retrieval process of items. Preferably, provided is a rotary carousel apparatus that provides rotational movement of the carousel to position items to a common point of removal. Preferably, provided is a rotary carousel apparatus that is useful in connection with pick-to-light/put-to-light systems, machine tending, high-capacity tool changers, kit-making, storage and retrieval systems, and other similar processes.

In accordance with one preferred and non-limiting embodiment, provided is a rotary carousel apparatus having a stationary base for supporting one or more rotating components and a central column fixed relative to the base. The central column includes a central axis extending along a longitudinal length of the central column. Provided is a rotatable first drive plate, preferably positioned at a first end of the central column, such that the rotatable first drive plate is rotatable about the central axis. Also provided is a at least one rotatable second drive plate, preferably positioned at a second end of the central column opposite the first end, such that the at least one rotatable second drive plate is rotatable about the central axis. At least one torque tube assembly is directly or indirectly coupled to the rotatable first drive plate and the at least one rotatable second drive plate. The at least one torque tube assembly is operable for rotational movement with a rotation of the rotatable first drive plate and/or the at least one rotatable second drive plate. A drive assembly is operatively coupled the rotatable first drive plate and/or the at least one rotatable second drive plate. At least one shelf is connected to the at least one torque tube assembly. Rotation of the drive assembly causes a corresponding rotation of at least one of the rotatable first drive plate and the at least one rotatable second drive plate connected thereto, and a rotation of the other of the rotatable first drive plate and the at least one rotatable second drive plate through the at least one torque tube assembly.

In accordance with a further preferred and non-limiting embodiment, the drive assembly further includes at least one motor having a driveshaft for providing a rotational input to the drive assembly. The driveshaft of the motor is operatively coupled to at least one gear set for transferring a torque input from the driveshaft of the motor to at least one of the rotatable first drive plate and the at least one rotatable second drive plate. The drive assembly is connected to the rotatable first drive plate and/or the at least one rotatable second drive plate by a drive hub and a flexible ring disposed between the drive hub and the drive plate.

In accordance with yet another preferred and non-limiting embodiment, the rotating carousel apparatus includes a bearing assembly having a fixed inner race connected to the central column, and a rotating outer race connected to at least one of the rotatable first drive plate and the at least one rotatable second drive plate. The at least one torque tube assembly is assembled from at least one hollow torque tube having a plurality of pins extending through at least a portion of a sidewall of the at least one hollow torque tube. In another embodiment, a plurality of torque tube assemblies are provided where a tie rod extends through each of the plurality of torque assemblies, such that the tie rod is coupled to the rotatable first drive plate at a first end and the at least one rotatable second drive plate at a second end.

In a further preferred and non-limiting embodiment, the base of the rotating carousel assembly further includes an adjustment mechanism for positioning the base in a substantially level and/or horizontal orientation. The base also includes a hold-down bracket for fixedly coupling the base to a floor surface. Additionally, one or more guide wheels are disposed between the central column and each of the plurality of the torque tube assemblies.

In accordance with yet another preferred and non-limiting embodiment, a drive mechanism for a rotary carousel apparatus includes a central column having a central axis extending along a longitudinal length thereof. A rotatable first drive plate is included and rotates about the central axis, and at least one rotatable second drive plate is included and rotates about the central axis. At least one torque tube assembly is directly or indirectly coupled to the rotatable first drive plate and the at least one rotatable second drive plate. The at least one torque tube assembly is operative for rotational movement with a rotation of the rotatable first drive plate and the at least one rotatable second drive plate. A drive assembly is operatively coupled to at least one of the rotatable first drive plate and the at least one rotatable second drive plate. Rotation of the drive assembly causes a corresponding rotation of at least one of the rotatable first drive plate and the at least one rotatable second drive plate connected thereto, and a rotation of the other of the rotatable first drive plate and the at least one rotatable second drive plate through the at least one torque tube assembly.

In another preferred and non-limiting embodiment, the drive assembly further includes at least one motor having a driveshaft operatively coupled to the drive assembly. The motor is in the form of a servo motor in communication with a feedback mechanism for determining an angular position of the driveshaft. The driveshaft of the motor is operatively coupled to at least one gear set for transferring a torque input from the driveshaft of the motor to at least one of the rotatable first drive plate and the at least one rotatable second drive plate.

In accordance with yet another preferred and non-limiting embodiment, the rotating carousel apparatus includes a bearing assembly having a fixed inner race connected to the central column and a rotating outer race connected to one of the rotatable first drive plate and the at least one rotatable second drive plate. The at least one torque tube assembly is assembled from at least one hollow torque tube having a plurality of pins extending through at least a portion of a sidewall of the at least one hollow torque tube. In one embodiment, a plurality of torque tube assemblies is provided and a tie rod extends through each of the plurality of torque assemblies, such that the tie rod is directly or indirectly coupled to the rotatable first drive plate at a first end and the rotatable second drive plate at a second end.

In a further preferred and non-limiting embodiment, a rotary carousel system includes a stationary base for supporting one or more rotating components and a central column fixed to the base. The central column has a central axis extending along a longitudinal length of the central column. A rotatable first drive plate is preferably provided at a first end of the central column and rotatable about the central axis. At least one rotatable second drive plate is preferably provided at a second end of the central column opposite the first end and rotatable about the central axis. At least one torque tube assembly is directly or indirectly coupled to the rotatable first drive plate and the at least one rotatable second drive plate. The at least one torque tube assembly is operative for rotational movement with a rotation of the rotatable first drive plate and the at least one rotatable second drive plate. At least one shelf is connected to the at least one torque tube assembly. Rotation of at least one of the rotatable first drive plate and the at least one rotatable second drive plate causes a corresponding rotation of the other of the rotatable first drive plate and the at least one rotatable second drive plate through the at least one torque tube assembly.

These and other features and characteristics of the rotary carousel apparatus, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
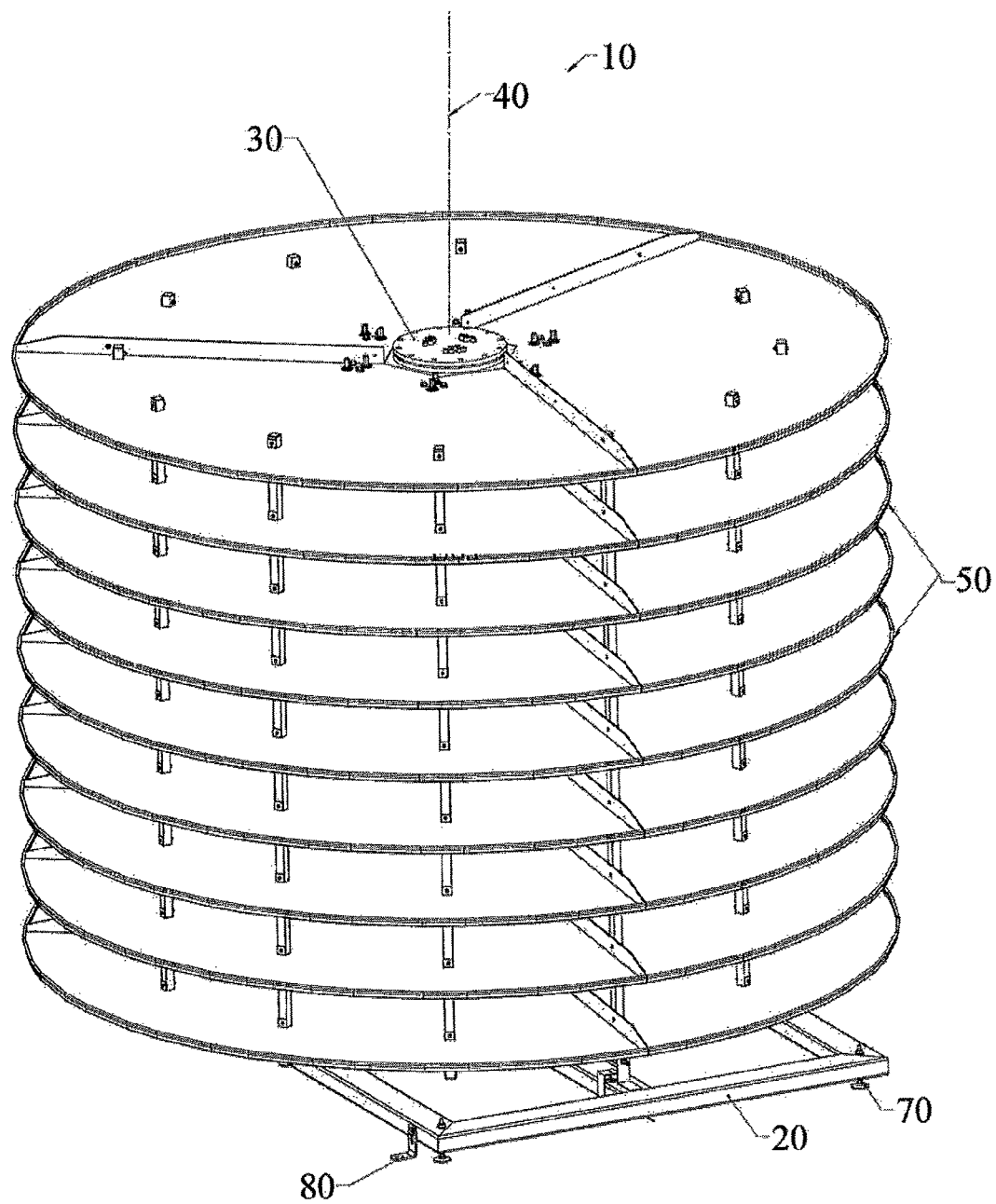
FIG. 1 is a perspective view of a rotary carousel apparatus in accordance with an embodiment of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to a rotary carousel apparatus 10, and certain preferred and non-limiting embodiments of the components thereof are illustrated in FIGS. 1-11. In general, the rotary carousel apparatus 10 of the present invention provides a rotatable platform typically used for storage and retrieval applications, such as in a pick-to-light/put-to-light application.

With reference to FIG. 1, a rotary carousel apparatus 10 (hereinafter referred to as "apparatus") includes a base 20 that supports a central column 30 rotatable about a central axis 40 extending through the central column 30. The base 20 defines a frame made from one or more structural members, such as tubular beams, for supporting the apparatus 10. No external framework is needed to support the central column 30 on the base 20, thereby eliminating a potential pinch-point where an operator could get caught between the rotating assembly and the external framework. At least one shelf 50 is supported on the central column 30, such that the at least one shelf 50 is rotatable about the central axis 40 with the rotation of the central column 30. In one preferred and non-limiting embodiment, a plurality of shelves 50 are provided, and these shelves 50 are spaced apart along a longitudinal length of the central column 30. Further, these shelves 50 may have equal or unequal longitudinal separation therebetween. In one embodiment, the at least one shelf 50 extends around the entire circumference of the central column 30. In alternate embodiments, one or more of the at least one shelf 50 extends only partially around the circumference of the central column 30.

With continued reference to FIG. 1, the base 20 includes at least one adjustable foot 70 for leveling the apparatus 10 on uneven ground. The adjustable foot 70 may be in the form of a threaded foot that is extendable from and retractable within the base 20 in a vertical direction. The base 20 may further include one or more hold-down brackets 80 for securing the apparatus 10 to the ground. One or more fasteners (not shown) are desirably used to secure the apparatus 10 by engaging the hold-down bracket 80.

Figure 2:
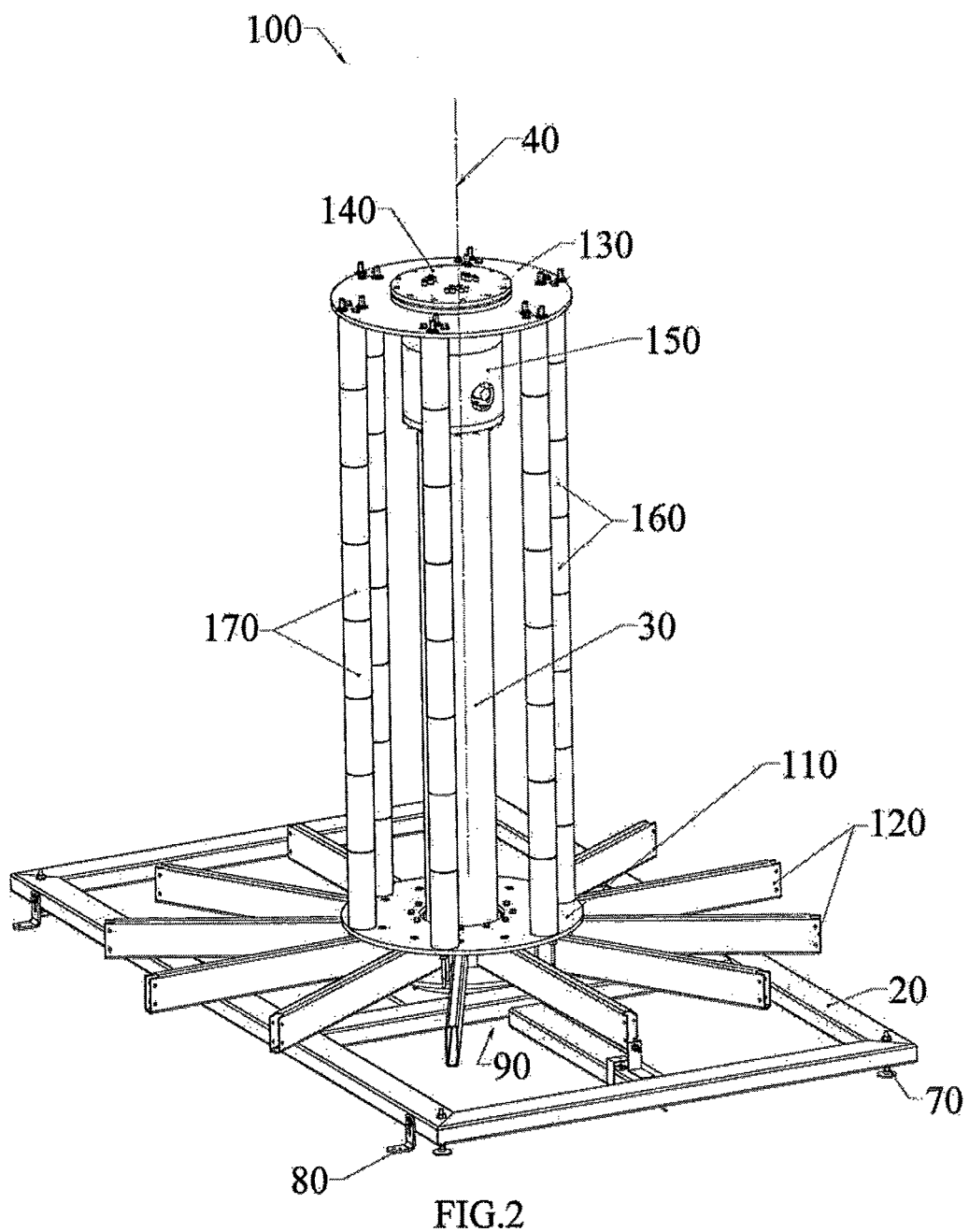
FIG. 2 is a perspective view of the rotary carousel apparatus shown without the shelves shown in FIG. 1.

With reference to FIG. 2, the apparatus 10 is illustrated with the shelves 50 removed therefrom. As can be seen from the figure, apparatus 10 includes a bottom assembly 90 provided at a lower end of the central column 30 and a top assembly 100 provided at an upper end of the central column 30. The bottom assembly 90 includes a bottom drive plate 110 that rotatably supports the plurality of shelves 50, as will be described in greater detail hereafter with reference to FIGS. 4-5. In one embodiment, the bottom assembly 90 includes a plurality of arms 120 extending radially outward from the bottom drive plate 110. Each of the plurality of arms 120 is desirably equally spaced from the adjoining arms. The plurality of arms 120 may be adapted for supporting a rod that extends through each of the plurality of shelves 50 for increasing the stability of the apparatus 10.

With continuing reference to FIG. 2, and in this preferred and non-limiting embodiment, the top assembly 100 includes a top drive plate 130 operatively connected to a drive hub 140 that is driven by a drive assembly 150. Operation of the drive assembly 150 to cause the movement of the drive hub 140 and the top drive plate 130 will be described hereafter with reference to FIGS. 6-7. The bottom assembly 90 and the top assembly 100 are connected by at least one torque tube assembly 160. The at least one torque tube assembly 160 transfers the drive torque from the top drive plate 130 to the bottom drive plate 110. In one preferred and non-limiting embodiment, a plurality of torque tube assemblies 160 are provided and positioned in a circumferential arrangement on the bottom drive plate 110 and the top drive plate 130. The torque tube assemblies 160 are desirably provided at substantially equal angular separation extending radially from the central axis 40.

While FIG. 2 illustrates six torque tube assemblies 160 spread apart in 60° intervals, one of ordinary skill in the art will understand that any number of torque tube assemblies 160 may be used to suit a particular application of the assembly 10. Each torque tube assembly 160 is assembled from one or more individual torque tubes 170 operatively connected together in a manner that will be described hereafter with reference to FIGS. 9-11. It should also be recognized that the top drive plate 130 and the bottom drive plate 110 may be positioned anywhere along the central column 30, and are only positioned at the ends of the central column 30 in one preferred and non-limiting embodiment. It is further envisioned that any number of drive plates 110, 130 may be used and positioned along or in relation to the central column 30, where any two or more of these drive plates 110, 130 are operatively coupled together using at least one torque tube assembly 160. Any such configuration should be considered within the scope and context of the present invention.

Figure 4:
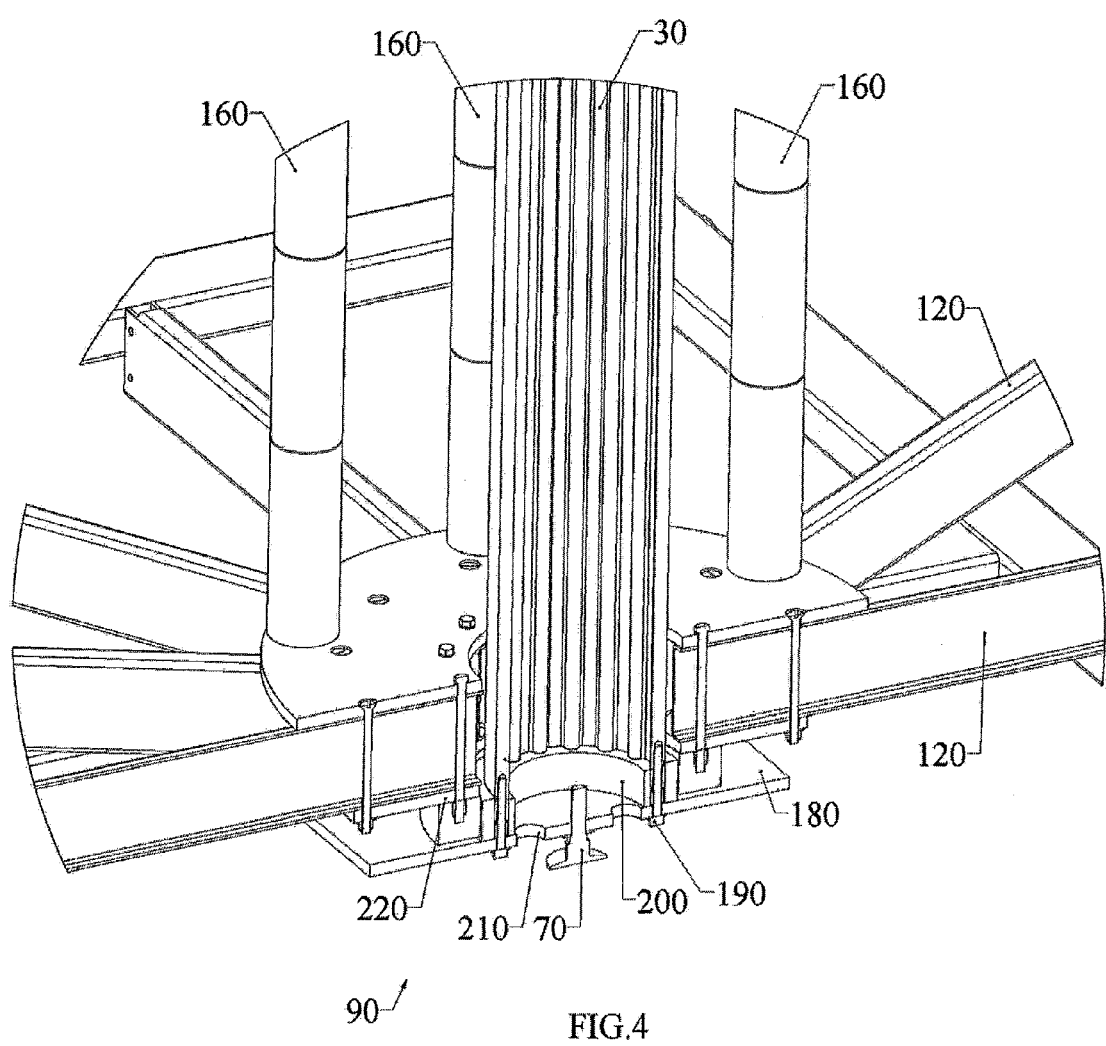
FIG. 4 is a perspective cross-sectional view of a bottom assembly of the rotary carousel apparatus shown in FIG. 1.
Figure 5:
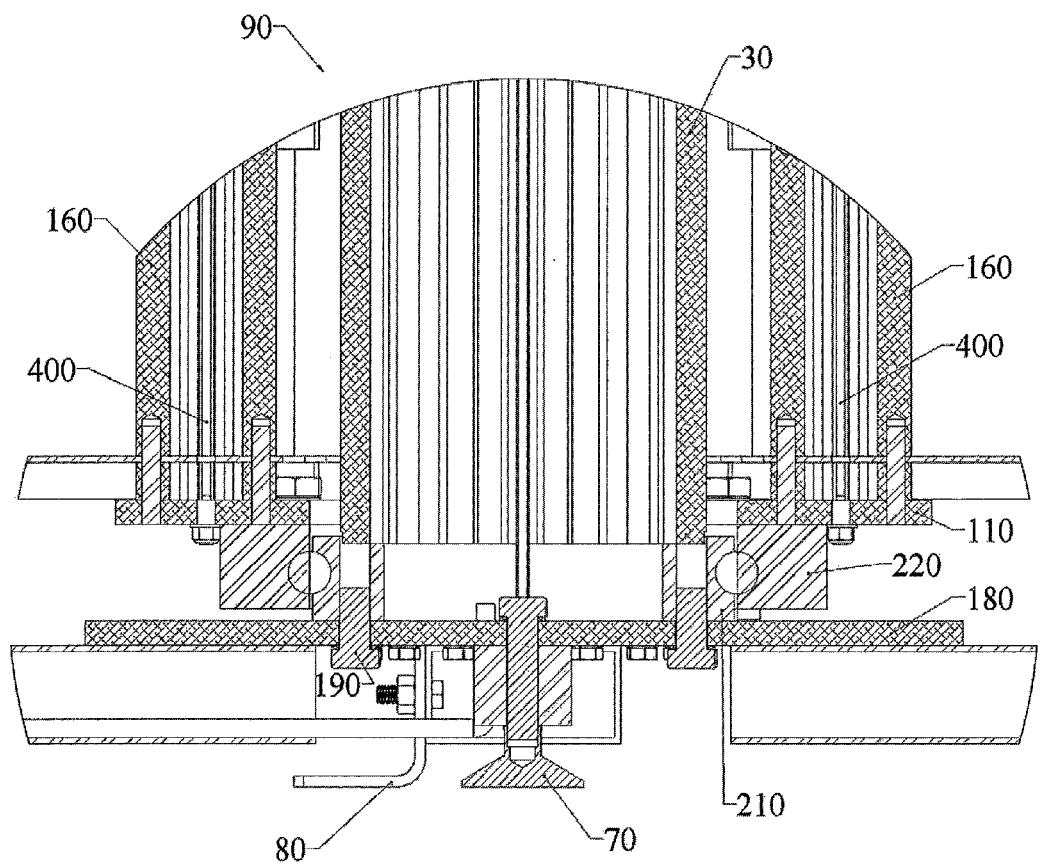
FIG. 5 is a plan cross-sectional view of the bottom assembly of the rotary carousel apparatus shown in FIG. 4.

With reference to FIGS. 4-5, the bottom assembly 90 includes the bottom drive plate 110 that is directly or indirectly coupled to a bearing plate 180 via one or more fasteners 190. The bottom assembly 90 further includes a bottom bearing assembly 200 having a fixed inner race 210 that is supported on the base 20 and a rotating outer race 220 that rotatably supports the bottom drive plate 110. In some embodiments, the bottom drive plate 110 is connected directly to the rotating outer race 220, such that the use of the bearing plate 180 is eliminated. As shown in FIGS. 4-5, the lower end of the central column 30 is directly or indirectly coupled to the fixed inner race 210, such that the central column 30 does not rotate with the rotation of the rotating outer race 220 and the bottom drive plate 110. As noted above, the torque tube assemblies 160 are directly or indirectly coupled to the bottom drive plate 110, preferably at an outer periphery thereof.

Figure 6:
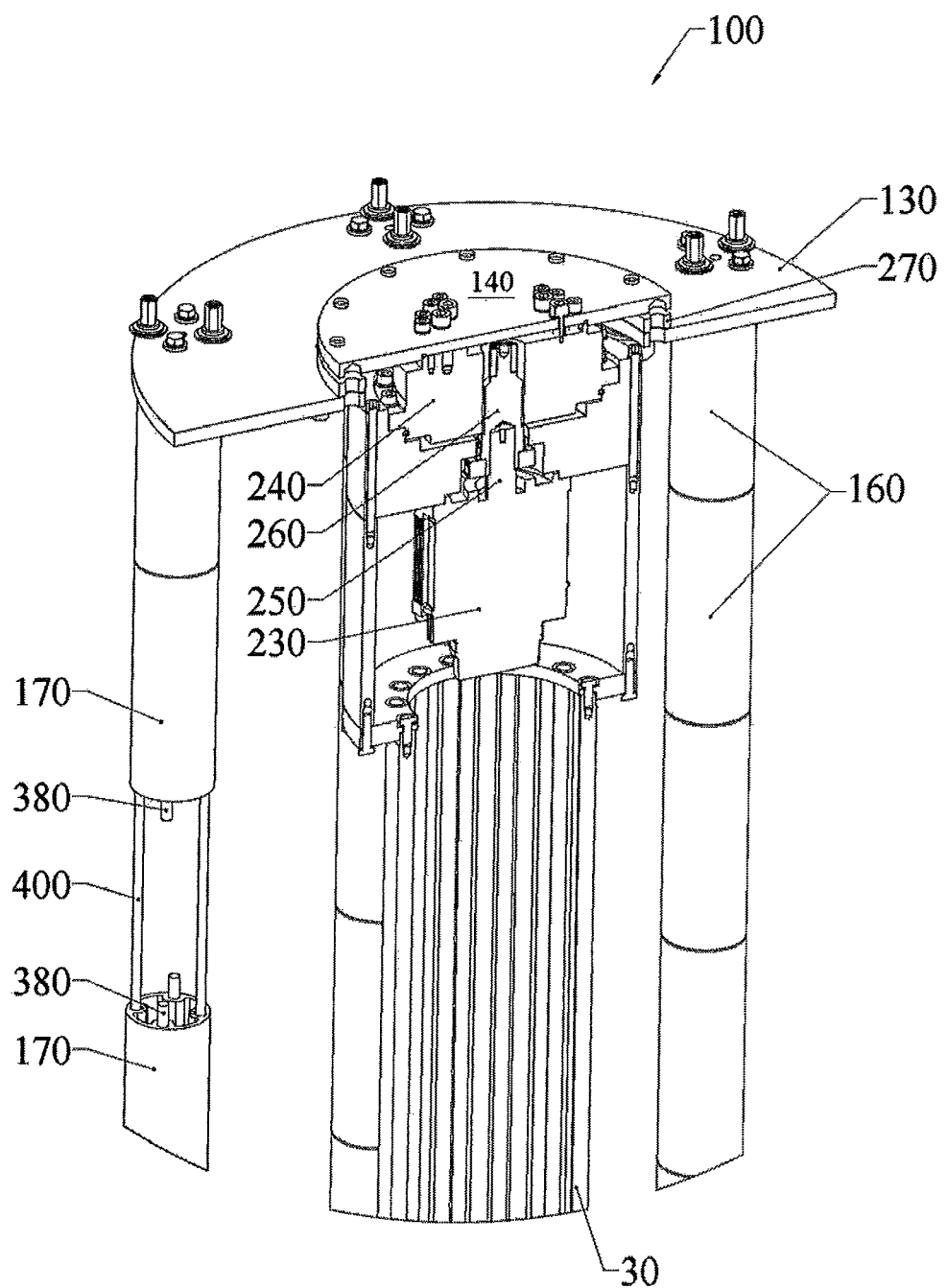
FIG. 6 is a perspective cross-sectional view of a top assembly of the rotary carousel apparatus shown in FIG. 1, illustrating a drive assembly of the rotary carousel apparatus.
Figure 7:
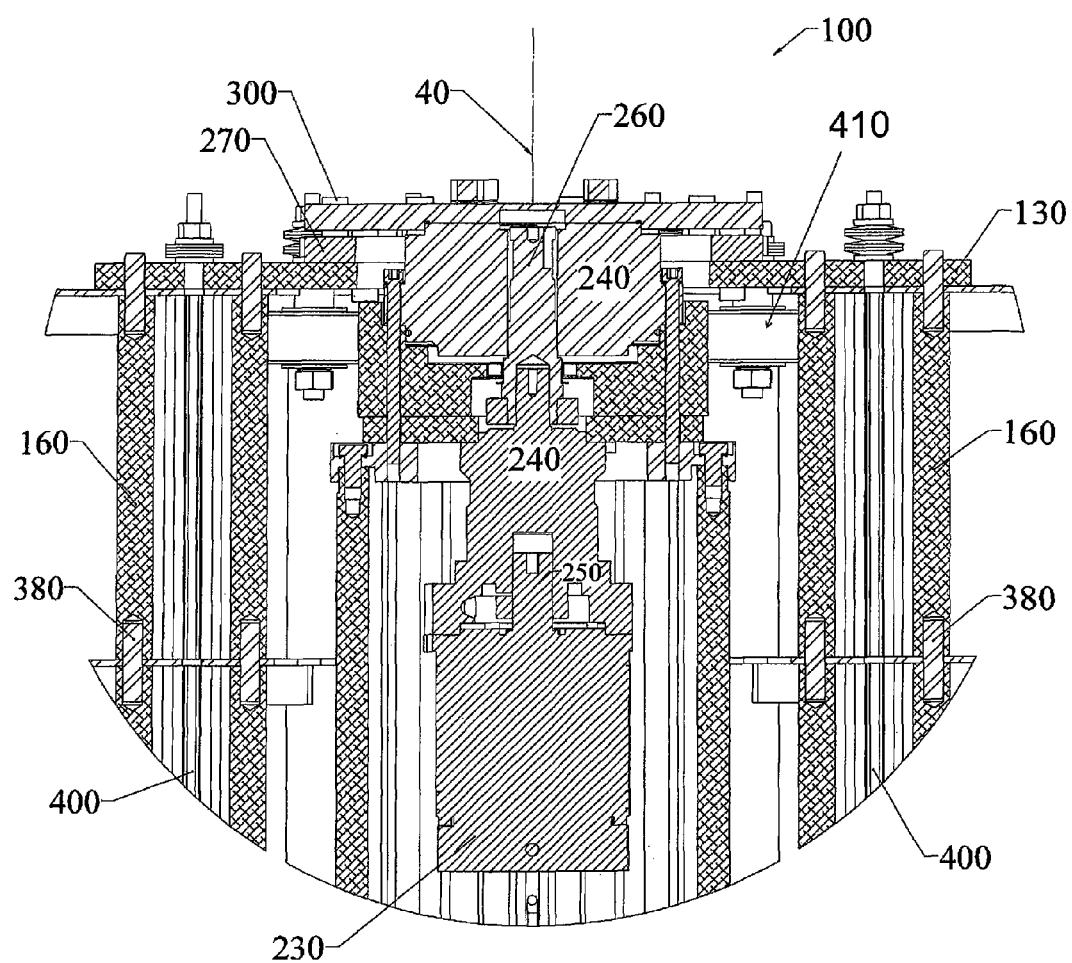
FIG. 7 is a plan cross-sectional view of the top assembly of the rotary carousel apparatus shown in FIG. 6.

With reference to FIGS. 6-7, the top assembly 100 includes the top drive plate 130 operatively connected to a drive hub 140 that is driven by a drive assembly 150. Operation of the drive assembly 150 causes the movement of the drive hub 140 and the drive plate 130. In one preferred and non-limiting embodiment, the drive assembly 150 includes a motor 230 and one or more gear sets 240 directly or indirectly coupled to the motor 230. In one embodiment, the motor 230 is a servo motor that includes a built-in feedback mechanism (not shown), such as an encoder, to accurately determine the angular position of the motor driveshaft 250. In another embodiment, the feedback mechanism may be external to the motor 230 and provided on the top assembly 100. The motor 230 is desirably a high-precision motor that has near zero "slop" in order to assure accurate determination of the position of the driveshaft 250. In some embodiments, the motor 230 may be connected to a controller (not shown) to control the operation of the motor 230. The controller may be programmed to operate the motor 230 to rotate the apparatus 10 to a desired position, such that one or more items can be retrieved from the shelf 50. The rotational movement of the apparatus 10 can be automated to index the apparatus 10 to an appropriate angular position to facilitate item retrieval from the shelf 50 in an automated manufacturing process, such as an automated assembly line. In one embodiment, the apparatus 10 can be integrated with one or more robots, programmable logic controllers, personal computers, and the like.

With continued reference to FIGS. 6-7, the drive hub 140 is directly or indirectly coupled to the driveshaft 250 of the motor 230 through an output shaft 260 of the one or more gear sets 240, such that rotation of the driveshaft 250 engages the one or more gear sets 240 (or, in one embodiment, the top drive plate 130 directly) to cause the drive hub 140 to rotate. The drive hub 140 may be directly or indirectly coupled to an output shaft 260 of the one or more gear sets 240 via a splined connection, by one or more bolts, or any other mechanical fastening arrangement to provide some direct or indirect positive engagement between the output shaft 260 and the drive hub 140. In certain applications where low torque input is required to operate the apparatus 10, the driveshaft 250 of the motor 230 may be directly or indirectly coupled to the drive hub 140, thereby eliminating the need for the one or more gear sets 240.

In another preferred and non-limiting embodiment, the top assembly 100 further includes at least one guide wheel 410 disposed between the central column 30 and each torque tube assembly 160. Each guide wheel 410 is attached to the top drive plate 130 and is rotatable about an axis that is substantially parallel to the central axis 40. The guide wheel 410 engages the exterior of the central column 30 and the exterior of the torque tube assembly 160 to minimize any wobble of the components as the drive plates 110, 130 rotate. While FIG. 7 illustrates the guide wheels 410 disposed at the top assembly 100 between the central column 30 and each torque tube assembly 160, the guide wheels 410 can be additionally, and/or alternatively, provided at the bottom assembly 90.

Figure 8:
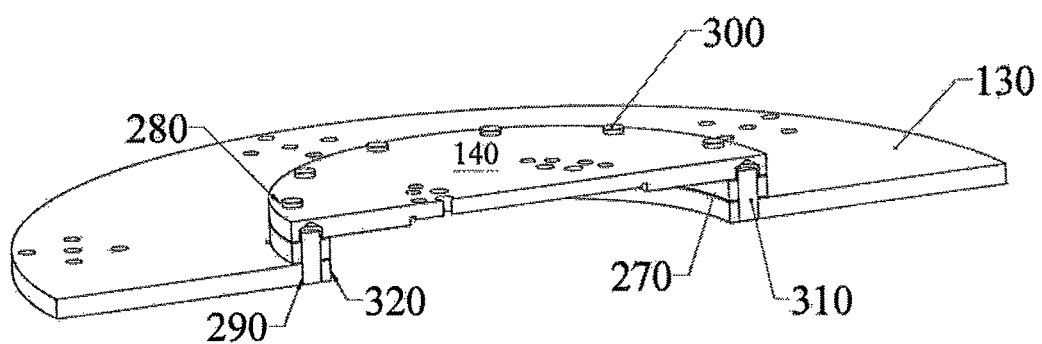
FIG. 8 is an exploded perspective view of a drive assembly of the rotary carousel apparatus shown in FIG. 6.

With reference to FIG. 8, and with continuing reference to FIGS. 6-7, torque from the drive hub 140 is transferred to the top drive plate 130 through a flexible ring 270, such as an elastomeric ring. The flexible ring 270 has an annular structure with a plurality of first holes 280 and a plurality of second holes 290 extending through the thickness of the flexible ring 270. The first and second holes 280, 290 are provided in an alternating arrangement such that each first hole 280 is located adjacent to two second holes 290, and vice versa. The drive hub 140 includes a plurality of first pins 300 that are spaced apart around an outer circumference of the drive hub 140 to engage each of the plurality of the first holes 280 on the flexible ring 270. Similarly, the top drive plate 130 includes a plurality of second pins 310 that are spaced apart around an inner perimeter of the top drive plate 130 proximate to an annular opening 320 in the top drive plate 130. The plurality of second pins 310 are arranged such that they can engage the plurality of second holes 290. Thus, the drive hub 140 is directly or indirectly coupled to the top drive plate 130 by the flexible ring 270 which provides a flexible coupling adapted for transferring the torque and precise rotational motion from the motor 230. The flexible connection between the components of the drive assembly 150 is adapted to compensate for any misalignment conditions between the output shaft 260 of the gear set 240, the drive hub 140, and the top drive plate 130. Additionally, the flexible ring 270 is adapted for providing near-zero backlash between top drive plate 130 and drive hub 140. Further, it is recognized that any number of holes 280, 290 and corresponding pins 300, 310 (or any similar connection structure) can be used to provide the desirable flexible coupling.

While the drive assembly 150 described with reference to FIGS. 6-8 has been described as being provided in the top assembly 100, one of ordinary skill in the art will appreciate that the drive assembly 150 could alternatively be provided in the bottom assembly 90 of the apparatus 10. In such an embodiment, the drive assembly 150 would drive the bottom drive plate 110 which would transfer the torque to the top drive plate 130 through the plurality of torque tube assemblies 160.

Figure 9:
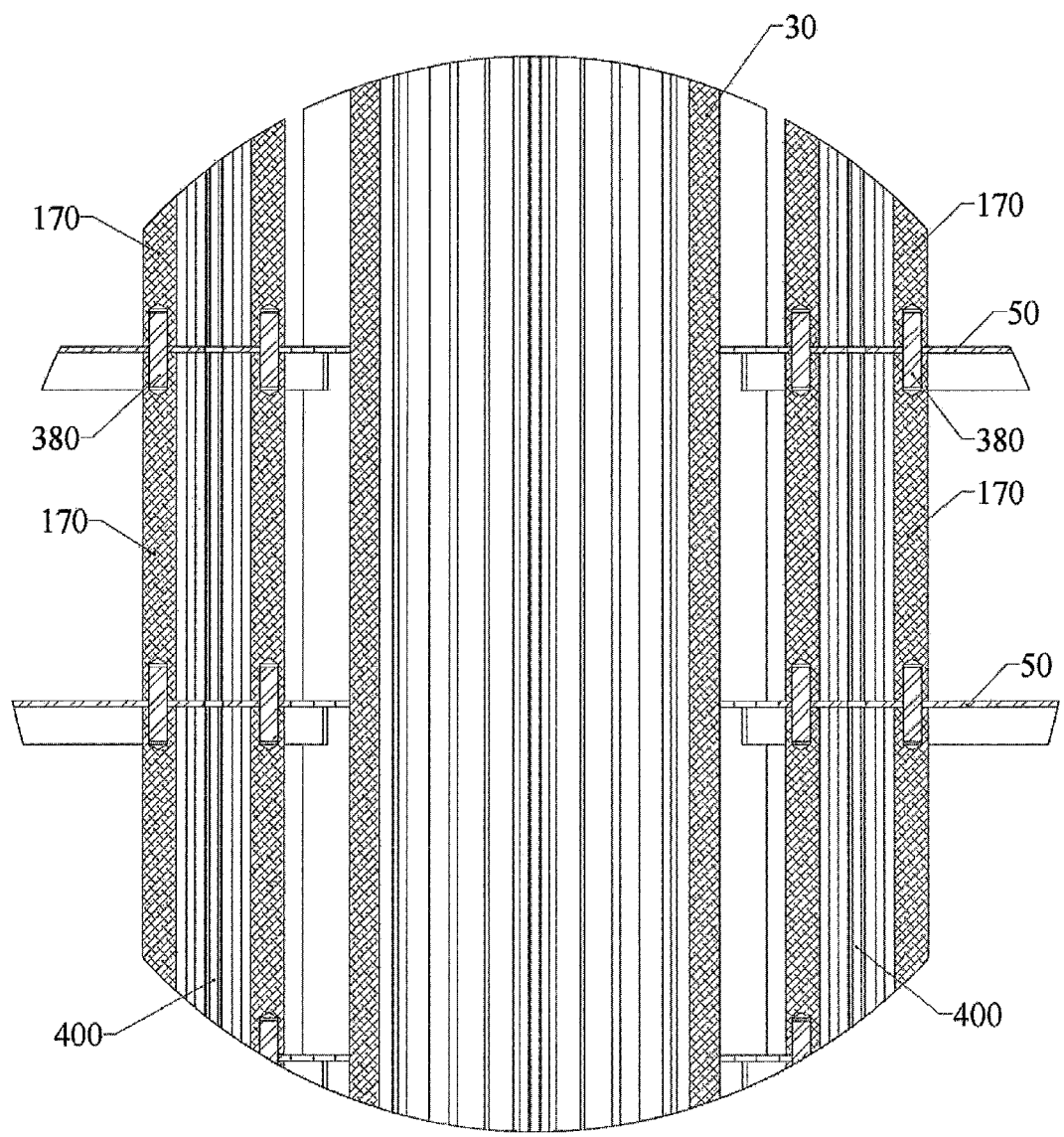
FIG. 9 is a plan cross-sectional view of a torque tube assembly.

With reference to FIG. 9, at least one torque tube assembly 160 is composed from one or more individual torque tubes 170 operatively connected together. The individual torque tubes 170 provide various functions to the apparatus 10, including, but not limited to: (1) acting as spacers between the shelves 50; (2) providing stability and strength to the structure of the apparatus 10; (3) acting as the components that transmit torque and motion from the drive assembly 150 to the rotating assembly of the drive plates 130, 110; (4) ensuring accurate alignment of the structure of the apparatus 10; and/or (5) aiding in the assembly of the apparatus 10, since no aligning or adjusting is required.

Figure 10:
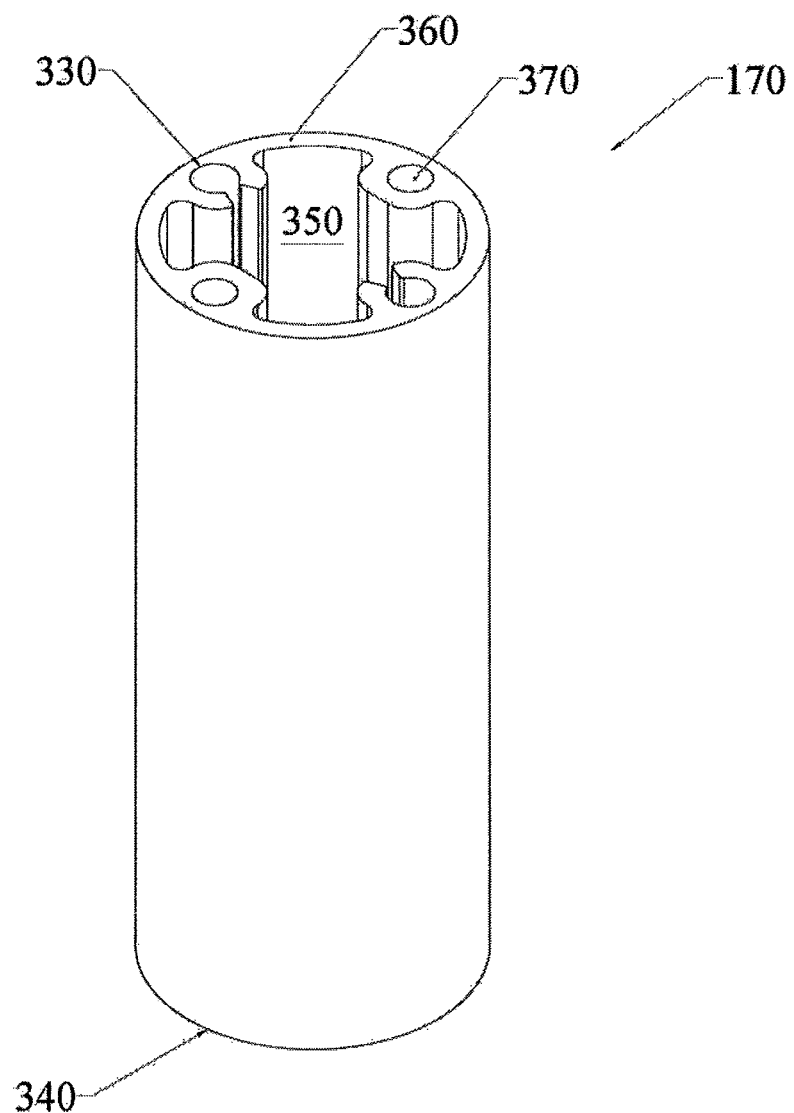
FIG. 10 is a perspective view of an individual torque tube of the torque tube assembly shown in FIG. 9.
Figure 11:
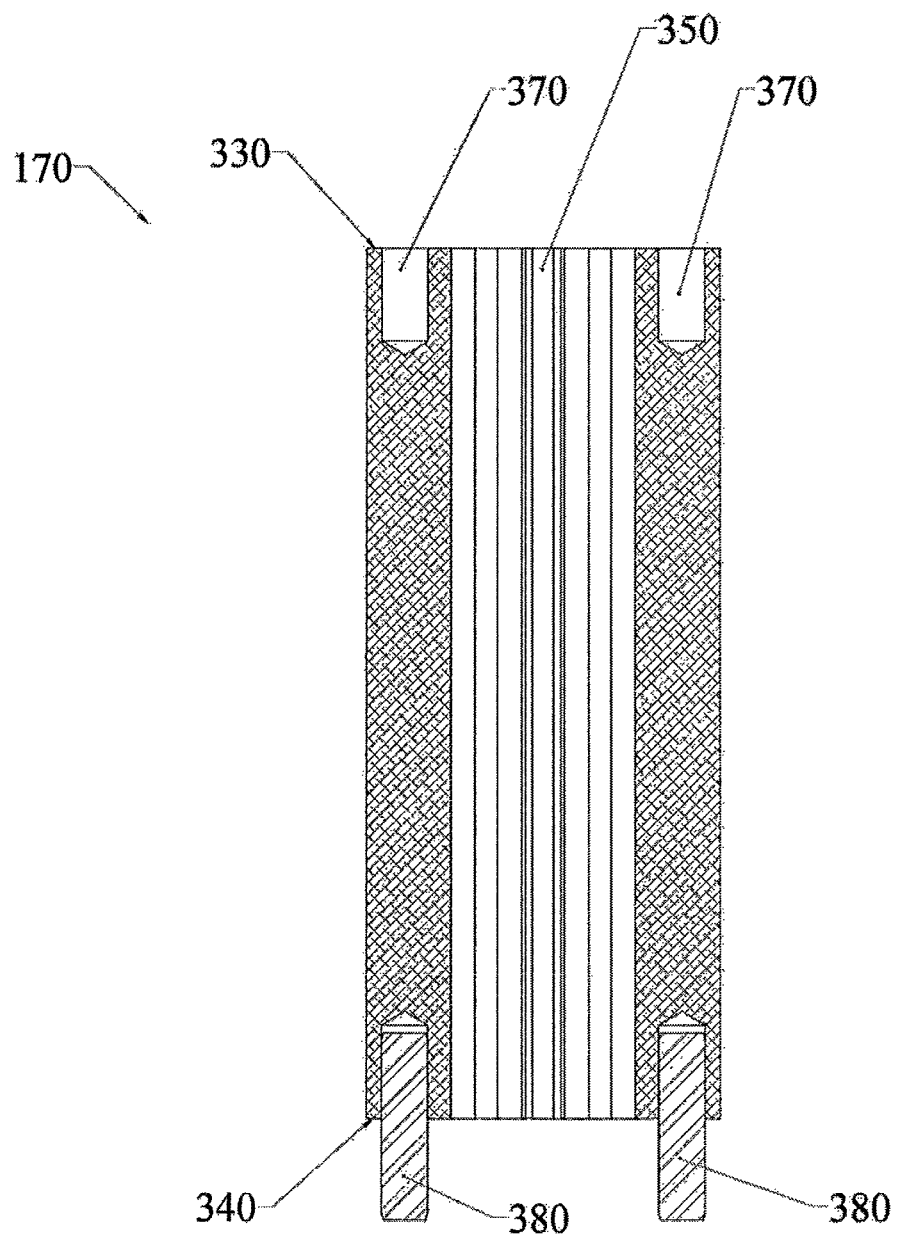
FIG. 11 is a plan cross-sectional view of the torque tube shown in FIG. 10.

As shown in FIGS. 9-11, and in another preferred and non-limiting embodiment, each torque tube 170 has a generally prismatic structure having a top end 330 opposite a bottom end 340 with a hollow interior 350 and a continuous sidewall 360 extending between the top end 330 and the bottom end 340. The sidewall 360 includes one or more grooves 370 for receiving a connecting pin 380, as shown in FIG. 9. The grooves 370 desirably extend through at least a portion of the sidewall 360 of each torque tube 170. In one embodiment, two cylindrical connecting pins 380 are inserted into the corresponding grooves 370 on each torque tube 170. In another embodiment, two cylindrical connecting pins 380 may be press-fit into the corresponding grooves 370 at the top end 330 or the bottom end 340. Such an arrangement allows for the insertion of the connecting pins 380 into the corresponding connecting grooves 370 on the bottom end 340 or the top end 330 of the adjoining torque tube 170 in order to form a nestable, modular arrangement. The connecting pins 380 maintain alignment between the adjoining torque tubes 170 and transmit the rotational torque from the top portion of the apparatus 10 to the bottom portion, or vice versa.

With continued reference to FIG. 9, a shelf 50 is provided between adjoining torque tubes 170. In this embodiment, the shelf 50 is disposed between the top end 330 of one torque tube 170 and the bottom end 340 of the adjoining torque tube 170, such that the shelf 50 is compressed between the sidewalls 360 of the adjoining torque tubes 170. The shelf 50 is desirably provided with a plurality of openings 390 through which the connecting pins 380 pass in order to connect the torque tubes 170. The length of the torque tubes 170 is selected to create the desired spacing between multiple shelves 50. Alternatively, or in addition, one or more spacers (not shown) may be provided between the adjoining torque tubes 170 to compensate for the thickness of the shelf 50 (in an embodiment where a shelf 50 is not provided between each of the adjoining torque tubes).

Figure 3:
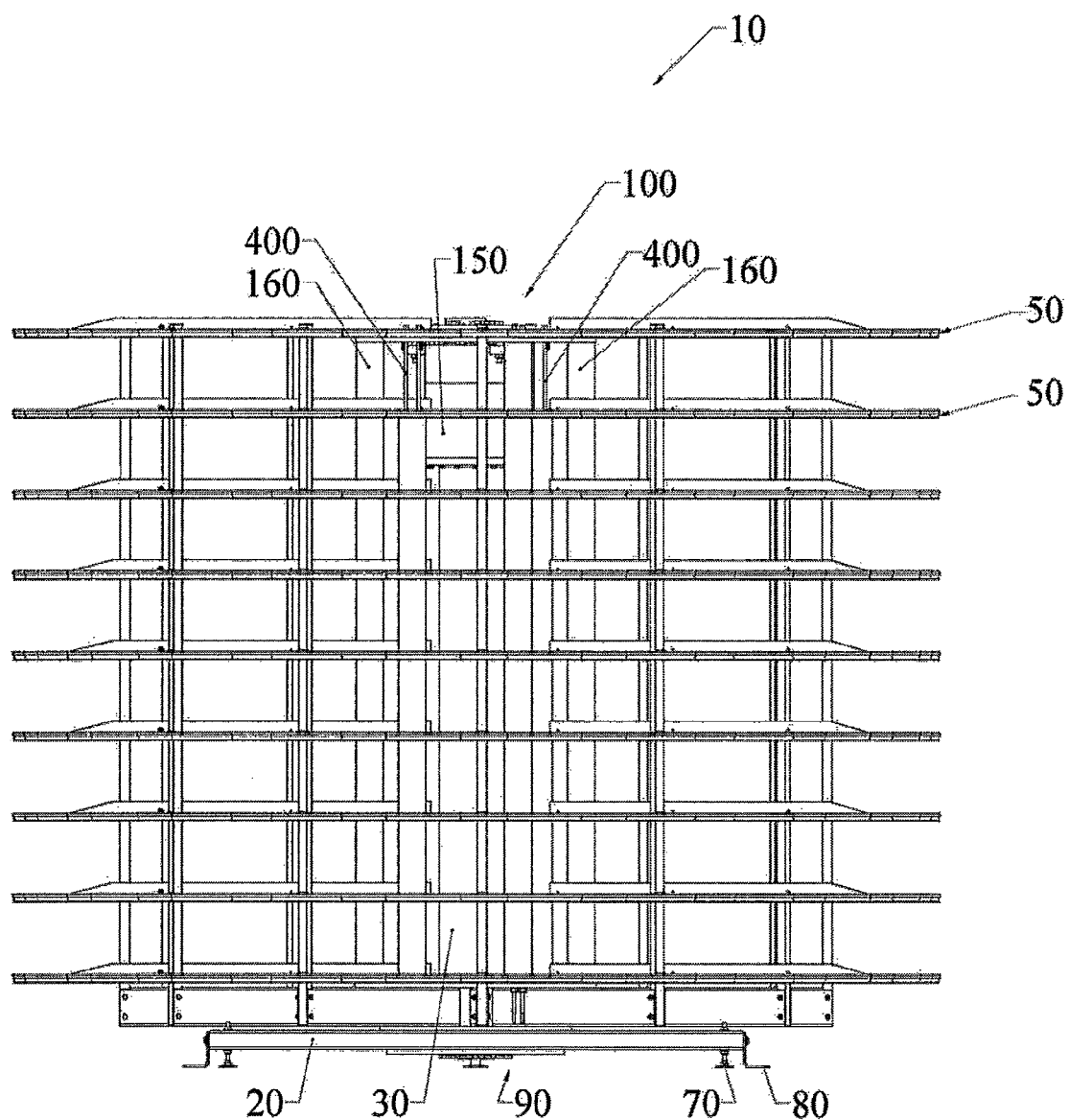
FIG. 3 is a cross-sectional side view of the rotary carousel apparatus shown in FIG. 1.

As shown in FIG. 9, and in another preferred and non-limiting embodiment, the torque tubes 170 of a torque tube assembly 160 are further connected together by a tie rod 400. As best illustrated in FIG. 3, the tie rod 400 extends through the hollow interior 350 of each individual torque tube 170 in a torque tube assembly 160 and is secured to the top drive plate 130 at its upper end and the bottom drive plate 110 at its lower end. The tie rod 400 in each torque tube assembly 160 further clamps the individual torque tubes 170 and the shelves 50 to form a space frame structure of the apparatus 10. Desirably, one tie rod 400 is provided in each of the torque tube assemblies 160; however, one of ordinary skill in the art will understand that the tie rod 400 may be omitted from one or more of the torque tube assemblies 160. Installation of the tie rod 400 in the torque tube assembly 160 establishes a frictional connection between the individual torque tubes 170 and shelves 50 to minimize the torsional load imposed on the connecting pins 380.

In one preferred and non-limiting embodiment, the apparatus 10 can be utilized in a "non-powered" or "powered" environment. In the non-powered environment, the apparatus 10 is manually rotated, such that parts are brought to the operator and travel time is eliminated. Thus, throughput can be maximized and effort minimized through the strategic positioning of "high traffic" parts.

While various embodiments of the rotary carousel apparatus were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

What is claimed is:

1. A rotary carousel apparatus for storing items on shelves comprising:
   a stationary base for supporting one or more rotating components;
   a central column fixed relative to the base, the central column having a central axis extending along a longitudinal length of the central column;
   a rotatable first drive plate configured to rotate about the central axis; at least one rotatable second drive plate configured to rotate about the central axis; at least one torque tube assembly directly or indirectly coupled to the rotatable first drive plate and the at least one rotatable second drive plate for torque transmission between the rotatable first drive plate and the at least one rotatable second drive plate, the at least one torque tube assembly operative for rotational movement with a rotation of the rotatable first drive plate and the at least one rotatable second drive plate;

a drive assembly operatively coupled to at least one of the rotatable first drive plate and the at least one rotatable second drive plate; and at least one shelf connected to the at least one torque tube assembly, wherein rotation of the drive assembly causes a corresponding rotation of one of the rotatable first drive plate and the at least one rotatable second drive plate connected thereto, and a rotation of the other of the rotatable first drive plate and the at least one rotatable second drive plate through the at least one torque tube assembly, and wherein the drive assembly is connected to at least one of the rotatable first drive plate and the at least one rotatable second drive plate by a drive hub and a flexible ring disposed between the drive hub and at least one of the rotatable first drive plate and the at least one rotatable second drive plate to compensate for any misalignment conditions between the drive assembly, the drive hub, and at least one of the rotatable first drive plate and the at least one rotatable second drive plate and limit backlash between the drive hub and at least one of the rotatable first drive plate and the at least one rotatable second drive plate.

2. The rotary carousel apparatus of claim 1, wherein the drive assembly further comprises at least one motor having a driveshaft for providing a rotational input to the drive assembly.

3. The rotary carousel apparatus of claim 2, wherein the driveshaft of the motor is operatively coupled to at least one gear set for transferring a torque input from the driveshaft of the motor to at least one of the rotatable first drive plate and the at least one rotatable second drive plate.

4. The rotary carousel apparatus of claim 1, further comprising a bearing assembly having a fixed inner race connected to the central column and a rotating outer race connected to at least one of the rotatable first drive plate and the at least one rotatable second drive plate.

5. The rotary carousel apparatus of claim 1, wherein the at least one torque tube assembly is assembled from at least one hollow torque tube having a plurality of pins extending through at least a portion of a sidewall of the at least one hollow torque tube.

6. The rotary carousel apparatus of claim 1, further comprising a plurality of torque tube assemblies, wherein a tie rod extends through each of the plurality of torque assemblies, and wherein the tie rod is directly or indirectly coupled to the rotatable first drive plate at a first end and the at least one rotatable second drive plate at a second end.

7. The rotary carousel apparatus of claim 1, wherein the base further comprises an adjustment mechanism for positioning the base in a level horizontal orientation.

8. The rotary carousel apparatus of claim 1, wherein the base further comprises a hold-down bracket for fixedly coupling the base to a floor surface.

9. The rotary carousel apparatus of claim 1, wherein a plurality of shelves are spaced apart along a longitudinal length of the central column.

10. The rotary carousel apparatus of claim 1, further comprising at least one guide wheel disposed between the central column and the at least one torque tube assembly.

11. A drive mechanism for rotating a rotary carousel apparatus, the drive assembly comprising:
  a fixed central column having a central axis extending along a longitudinal length of the central column, wherein the fixed central column is adapted to be mounted to a stationary base;
  a rotatable first drive plate configured to rotate about the central axis;
  at least one rotatable second drive plate configured to rotate about the central axis;
  at least one torque tube assembly directly or indirectly coupled to the rotatable first drive plate and the at least one rotatable second drive plate for torque transmission between the rotatable first drive plate and the at least one rotatable second drive plate, the at least one torque tube assembly operative for rotational movement with a rotation of the rotatable first drive plate and the at least one rotatable second drive plate;
  and a drive assembly operatively coupled to one of the rotatable first drive plate and the at least one rotatable second drive plate,
  wherein rotation of the drive assembly causes a corresponding rotation of one of the rotatable first drive plate and the at least one rotatable second drive plate connected thereto and a rotation of the other of the rotatable first drive plate and the at least one rotatable second drive plate through the at least one torque tube assembly,
  wherein the drive assembly further comprises at least one motor having a driveshaft for providing a rotational input to the drive assembly and the driveshaft is operatively coupled to at least one gear set for transferring a torque input from the driveshaft of the motor to at least one of the rotatable first drive plate and the at least one rotatable second drive plate,
  and wherein the drive assembly is connected to at least one of the rotatable first drive plate and the at least one rotatable second drive plate by a drive hub and a flexible ring disposed between the drive hub and at least one of the rotatable first drive plate and the at least one rotatable second drive plate to compensate for any misalignment conditions between the drive assembly, the drive hub, and at least one of the rotatable first drive plate and the at least one rotatable second drive plate and limit backlash between the drive hub and at least one of the rotatable first drive plate and the at least one rotatable second drive plate.

12. The drive mechanism of claim 11, wherein the motor is a servo motor in communication with a feedback mechanism for determining an angular position of the driveshaft.

13. The drive mechanism of claim 11, further comprising a bearing assembly having a fixed inner race connected to the central column and a rotating outer race connected to at least one of the rotatable first drive plate and the at least one rotatable second drive plate.

14. The drive mechanism of claim 11, wherein the at least one torque tube assembly is assembled from at least one hollow torque tube having a plurality of pins extending through at least a portion of a sidewall of the at least one hollow torque tube.

15. The drive mechanism of claim 11, further comprising a plurality of torque tube assemblies, wherein a tie rod extends through each of the plurality of torque assemblies, and wherein the tie rod is directly or indirectly coupled to the rotatable first drive plate at a first end and the at least one rotatable second drive plate at a second end.

16. A rotary carousel system for storing items on shelves comprising:
- a stationary base for supporting one or more rotating components;
- a central column fixed relative to the base, the central column having a central axis extending along a longitudinal length of the central column;
- a rotatable first drive plate configured to rotate about the central axis;
- at least one rotatable second drive plate configured to rotate about the central axis;
- at least one tube assembly directly or indirectly coupled to the rotatable first drive plate and the at least one rotatable second drive plate for torque transmission between the rotatable first drive plate and the at least one rotatable second drive plate, the at least one torque tube assembly operative for rotational movement with a rotation of the rotatable first drive plate and the at least one rotatable second drive plate;
- a drive assembly operatively coupled to one of the rotatable first drive plate and the at least one rotatable second drive plate, wherein, in use, the drive assembly causes at least one of the rotatable first drive plate and the at least one rotatable second drive plate to rotate; and
- at least one shelf connected to the at least one torque tube assembly, wherein rotation of one of the rotatable first drive plate and the at least one rotatable second drive plate causes a corresponding rotation of the other of the rotatable first drive plate and the at least one rotatable second drive plate through the at least one torque tube assembly, and
wherein the drive assembly is connected to at least one of the rotatable first drive plate and the at least one rotatable second drive plate by a drive hub and a flexible ring disposed between the drive hub and at least one of the rotatable first drive plate and the at least one rotatable second drive plate plate to compensate for any misalignment conditions between the drive assembly, the drive hub, and at least one of the rotatable first drive plate and the at least one rotatable second drive plate and limit backlash between the drive hub and at least one of the rotatable first drive plate and the at least one rotatable second drive plate.

* * * * *

UNITED STATES PATENT AND TRADEMARK OFFICE
CERTIFICATE OF CORRECTION

| | | |
|---|---|---|
| PATENT NO. | : 9,022,236 B1 | Page 1 of 1 |
| APPLICATION NO. | : 13/771493 | |
| DATED | : May 5, 2015 | |
| INVENTOR(S) | : Richard M. Amendolea et al. | |

It is certified that error appears in the above-identified patent and that said Letters Patent is hereby corrected as shown below:

In the claims

Column 12, Line 16, Claim 16, delete "plate plate" and insert -- plate --

Signed and Sealed this
Sixth Day of October, 2015

Michelle K. Lee
*Director of the United States Patent and Trademark Office*